(12) United States Patent
Latiolais, Jr. et al.

(10) Patent No.: US 7,159,619 B2
(45) Date of Patent: Jan. 9, 2007

(54) THREAD PROTECTOR FOR USE ON PIN END OF OILFIELD TUBULARS

(75) Inventors: Burney J. Latiolais, Jr., Lafayette, LA (US); Johnny Firmin Elkins, Youngsville, LA (US); Keith T. Lutgring, Lafayette, LA (US); John K. M. Saichuk, Lafayette, LA (US); Braxton I. Moody, V, Tomball, TX (US); Samuel P. Hawkins, III, Lafayette, LA (US)

(73) Assignee: Frank's International, Inc., Houston, TX (US)

( * ) Notice: Subject to any disclaimer, the term of this patent is extended or adjusted under 35 U.S.C. 154(b) by 381 days.

(21) Appl. No.: 10/689,913

(22) Filed: Oct. 21, 2003

(65) Prior Publication Data

US 2005/0081933 A1 Apr. 21, 2005

(51) Int. Cl.
B65D 59/06 (2006.01)
(52) U.S. Cl. .................................. 138/96 T; 294/119.2
(58) Field of Classification Search ............. 138/96 R, 138/96 T; 294/119.2, 90, 92
See application file for complete search history.

(56) References Cited

U.S. PATENT DOCUMENTS

| | | | | |
|---|---|---|---|---|
| 1,600,860 A | * | 9/1926 | Young .................... | 138/96 T |
| 2,073,389 A | * | 3/1937 | Engstrom ................. | 138/96 T |
| 2,175,414 A | * | 10/1939 | Stevenson ................. | 138/96 T |
| 2,628,134 A | * | 2/1953 | Williams et al. ......... | 175/325.7 |
| 3,038,502 A | * | 6/1962 | Hauk et al. ............... | 138/96 R |
| 3,240,232 A | * | 3/1966 | Matherne .................. | 138/96 T |
| 3,485,271 A | * | 12/1969 | Halsey ..................... | 138/96 T |
| 3,858,613 A | * | 1/1975 | Musslewhite ............. | 138/96 T |
| 4,349,048 A | * | 9/1982 | Clark ....................... | 138/96 T |
| 4,354,529 A | * | 10/1982 | Soutsos et al. ........... | 138/96 T |
| 5,148,835 A | * | 9/1992 | Clark ....................... | 138/96 T |
| 5,368,074 A | * | 11/1994 | Hall ......................... | 138/96 T |
| 5,524,672 A | | 6/1996 | Mosing et al. ............ | 138/96 T |
| 5,706,894 A | | 1/1998 | Hawkins, III ............. | 166/208 |
| 5,819,805 A | | 10/1998 | Mosing et al. ............ | 138/96 T |
| 2005/0082857 A1 | * | 4/2005 | Latiolais et al. .......... | 294/119.2 |

* cited by examiner

*Primary Examiner*—James Hook
(74) *Attorney, Agent, or Firm*—The Matthews Firm

(57) ABSTRACT

A cylindrical ring sized to slide over the box end of an oilfield tubular having a given external diameter, has a shoulder at one its ends and a sidewall along its length. The sidewall has a circumferential groove about its interior surface housing a band which can be made tight against the exterior surface of the oilfield tubular by a latch, accessible through a slot in the sidewall, and which becomes even tighter if the tubular attempts to escape from the band. In a first orientation, the cylindrical ring is used as a load ring. By turning the cylindrical ring upside down, the cylindrical ring is used as a thread protector for the pin end of the tubular.

16 Claims, 10 Drawing Sheets

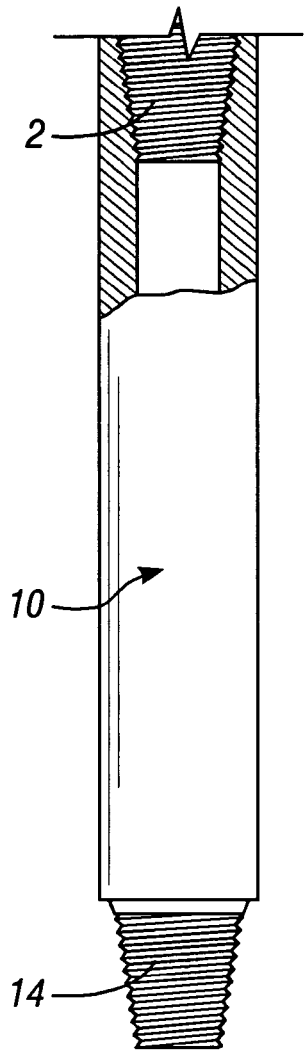 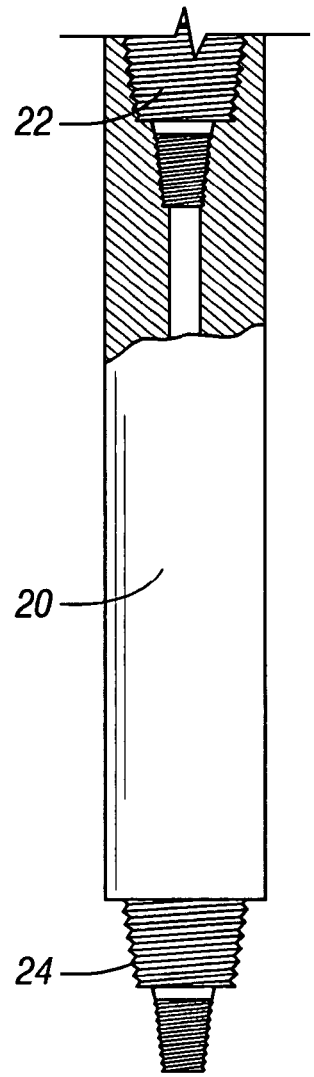 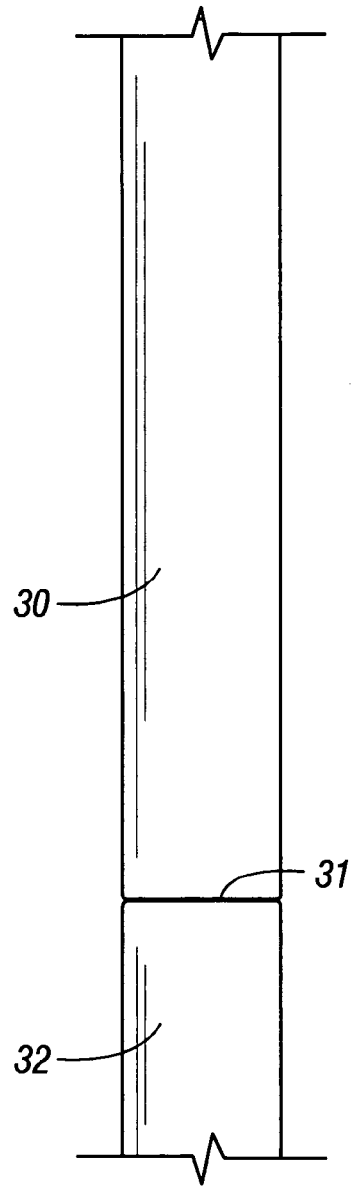
**FIG. 1
(PRIOR ART)**
**FIG. 2
(PRIOR ART)**
**FIG. 3
(PRIOR ART)**

FIGURE 10
FIG.9
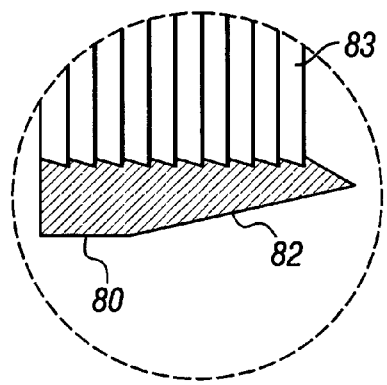
FIG.10
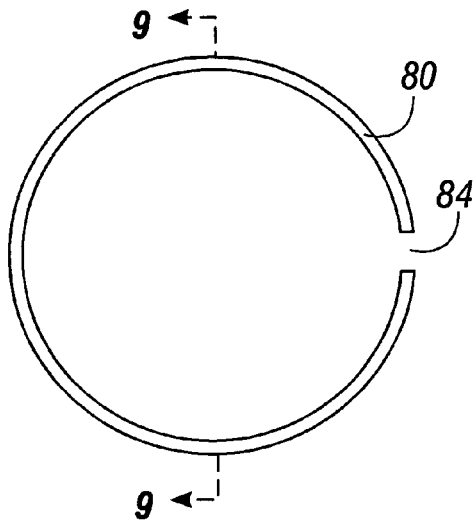
FIG.11
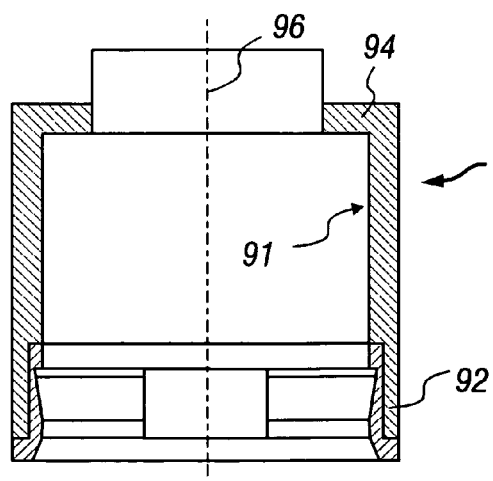
FIG. 12

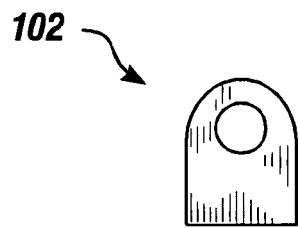
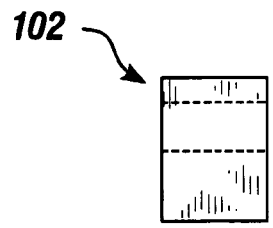
FIG. 14A                    FIG. 14B
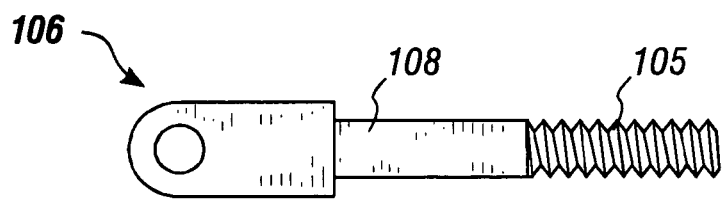
FIG. 15A
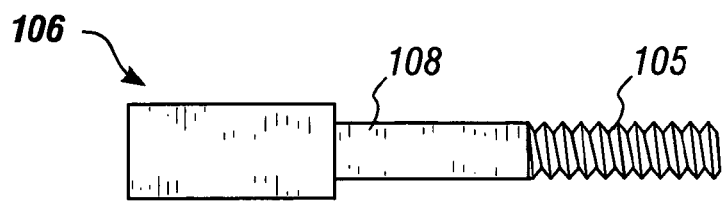
FIG. 15B
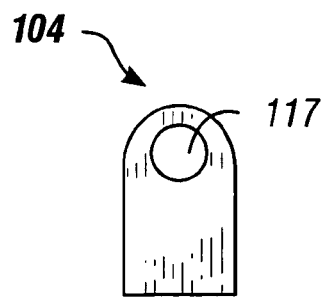
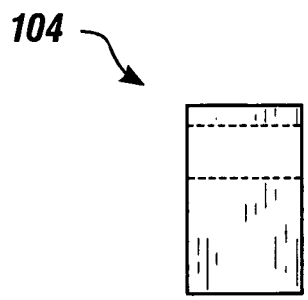
FIG. 16A                    FIG. 16B

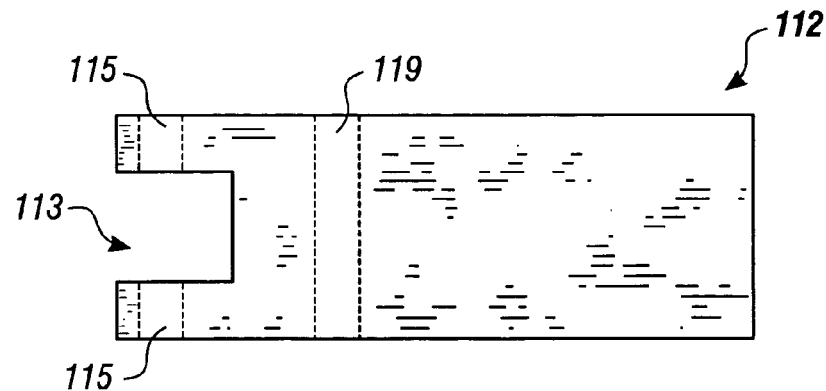
FIG. 17A
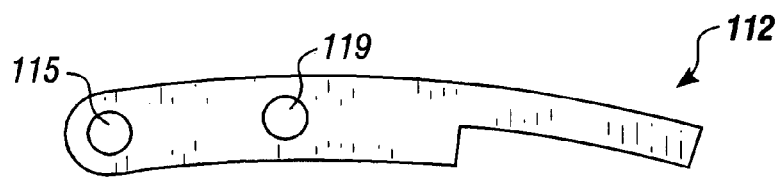
FIG. 17B
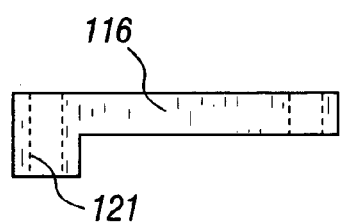 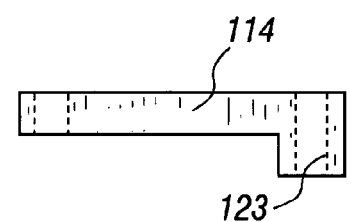
FIG. 18A            FIG. 19A
 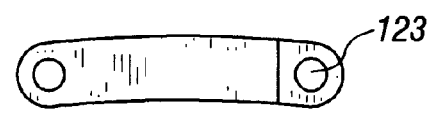
FIG. 18B            FIG. 19B

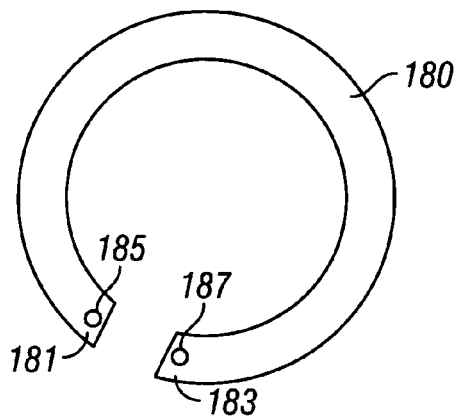
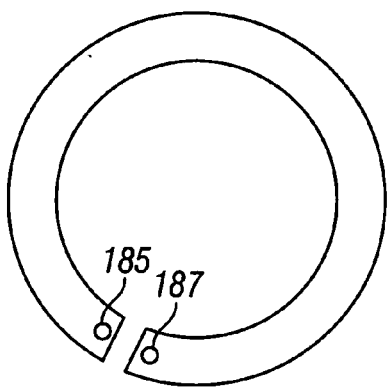
FIG. 22A  FIG. 22B
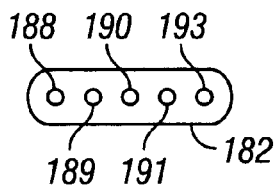
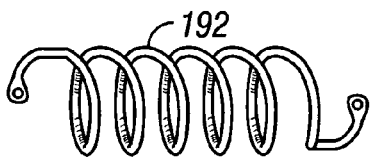
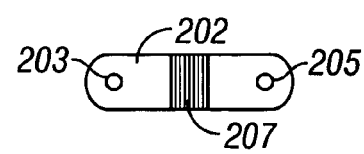
FIG. 22C  FIG. 22D  FIG. 22E
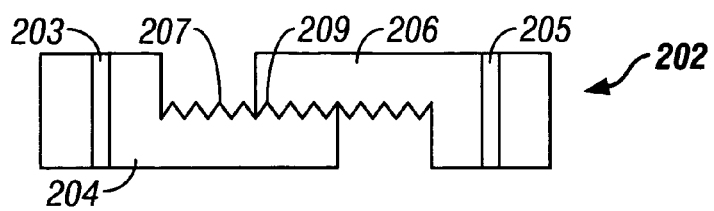
FIG. 22F

THREAD PROTECTOR FOR USE ON PIN END OF OILFIELD TUBULARS

RELATED APPLICATION

U.S. patent Ser. No. 10/690,445, filed Oct. 21, 2003, entitled Load Ring for Lifting by an Elevator, of Casing Having No Upset.

TECHNICAL FIELD

This invention relates, generally, to apparatus which are useful for safely transporting oilfield tubulars, and specifically, to raising and/or lowering a length of oilfield tubulars, and/or for otherwise safely moving a length of oilfield tubulars.

BACKGROUND OF THE INVENTION

Tubular goods whose use includes, but is not limited to, use in the drilling for, and production of oil and gas, experience a considerable amount of handling and a certain degree of mishandling and abuse on their journey from the steel mill to the final well destination. As a result, screw on cylindrical thread protectors with a full compliment of threads are placed on such tubular goods to protect the threads from any harm prior to installation. However, because the removal of such protectors often requires an expenditure of time that cannot be tolerated during the installation of tubular strings in wells, the original protector is often removed at the well site and is replaced with a different protector with quick release and installation capabilities. The tubular good subsequently rides from rack to rig with the new thread protector which is eventually removed when the joint is to be threadedly attached to the downwardly continuing string. During the interval that the protector is on the threads, a last bore drift test is usually done and it is desirable that the protector does not interfere with the drift passage. Once the string is pulled out of the hole, the quick install capabilities of such a thread protector ensure protection for the threads on tubular goods whose threads have not been damaged in the drilling activity.

A considerable amount of development work has been done in efforts to improve the bands and related tensioning gear to keep the casing protectors from being knocked off the threads during the rack to well trip.

The body of protectors in rig site use are currently made of elastomer, sometimes polyurethane, but may sometimes be made of other material, such as black rubber. The elastomer is formulated and cured to serve the skid and bash protection function and does not always favor thread gripping. In order for the elastomer to adequately grip the threads on the tubular goods to be protected, a sufficient amount of hoop force must be applied, which is often accomplished through the tensioning of bands around the elastomer. However, such securing bands are designed to be tensioned by hand and consequently, seldom have enough energy to drive the elastomer into the thread grooves sufficiently to prevent the occasional slipping of the protector.

Furthermore, the thread protectors on the rig site are currently designed so that the elastomer is pulled apart to accommodate the threads to be protected and subsequently tightened around such threads when the protector is in place. The net effect of repetitive pulling apart is that the elastomer would eventually deform due to the repetitive yielding, causing the elastomer to lose its memory characteristics.

PRIOR ART

There have been many attempts in this art to provide improved protectors for male threads on the pin end of oilfield tubulars.

U.S. Pat. No. 5,524,672 to Mosing, et al, and U.S. Pat. No. 5,819,805 to Mosing, et al, each being assigned to Frank's Casing Crew and Rental Tools, Inc., are two such prior art patents. The prior art has typically used components which are in intimate contact with the male threads, and while they oftentimes have been used with a great deal of success, have sometimes failed to protect the threads when the tubular is dropped or banged against hard surfaces such as rig floors of ramps and truck bodies. This is especially true when such prior art protectors are used with two-step threaded oilfield tubulars having premium threads.

U.S. Pat. No. 5,706,894 to Samuel P. Hawkins, assigned to Frank's International, Inc., the assignee of this present invention, shows a device for suspending various downhole tools below the device for repair and maintenance purposes. Frank's Casing Crew and Rental Tools, Inc. and Frank's International, Inc. are affiliated companies.

Moreover, there have been many attempts to provide lifting surface on the exterior of smooth surfaced oilfield tubulars to which elevators can be attached to either raise, lower, or otherwise move said oilfield tubulars.

The objects, features and advantages of this invention will be apparent to those skilled in this art from a consideration of this specification, including the attached claims, the included Abstract and the appended drawings.

BRIEF DESCRIPTION OF THE DRAWINGS

FIG. 1 is an elevated view, partly in cross section, in an oilfield tubular, which is well-known in this art;

FIG. 2 is an elevated view, partly in cross section, of another oilfield tubular known in the prior art having premium, multi-step threads on its pin end;

FIG. 3 is an elevated, schematic view of a pair of oilfield tubulars threaded together to create a smooth connection, also known in the prior art;

FIG. 9 is a side view of a band which is used within the interior of the device illustrated in FIG. 6;

FIG. 10 is a sectional, enlarged view of a portion of the band illustrated in FIG. 9;

FIG. 11 is a top plan view of the band illustrated in FIG. 9 in accordance with the present invention.

FIG. 12 is an elevated view, partly in cross-section, of a thread protector, in accordance with present invention;

FIG. 14A is padeye which is used with the latching assembly of FIG. 13A in accordance with the invention;

FIG. 14B is a different view of the padeye illustrated in FIG. 14A;

FIG. 15A is a side view of a draw bolt which is used in the latching mechanism illustrated in FIG. 13A;

FIG. 15B is a different view of the draw bolt illustrated in FIG. 15A;

FIG. 16A is a view of the handle padeye which is used in the latching mechanism illustrated in FIG. 13A;

FIG. 16B is a different view of the handle padeye illustrated in FIG. 16A;

FIG. 17A is one view of the handle which is used with the latching mechanism illustrated in FIG. 13A;

FIG. 17B is a different view of the handle shown in FIG. 17A;

FIG. 18A is a view of a link which is used in the latching mechanism illustrated in FIG. 13A;

FIG. 18B is a different view of the link illustrated in FIG. 18A;

FIG. 19A is one view of a second link used in the latching mechanism illustrated in FIG. 13A;

FIG. 19B is a different view of the second link illustrated in FIG. 19A.

FIG. 22A is a top-plan view of the band 180 which is analogous to the band 80, both as to design and as to function, but having different means to cause its two ends to be moved closer together;

FIG. 22B is a top-plan view of the band 180, as illustrated in FIG. 22A, but having its two ends moved closer together;

FIG. 22C is a top-plan view of a second band 182 for maintaining the two ends of the first band 180 closer together;

FIG. 22D is a top-plan view of a spring 192 serving as an alternative means for establishing and maintaining the two ends of the band 180 closer together;

FIG. 22E is a top-plan view of yet another alternative means for establishing and maintaining the two ends of the band 180 closer together; and FIG. 22F is a side, elevated, schematic view of the device illustrated in FIG. 22E.

DETAILED DESCRIPTION OF THE DRAWINGS

Figure 4:
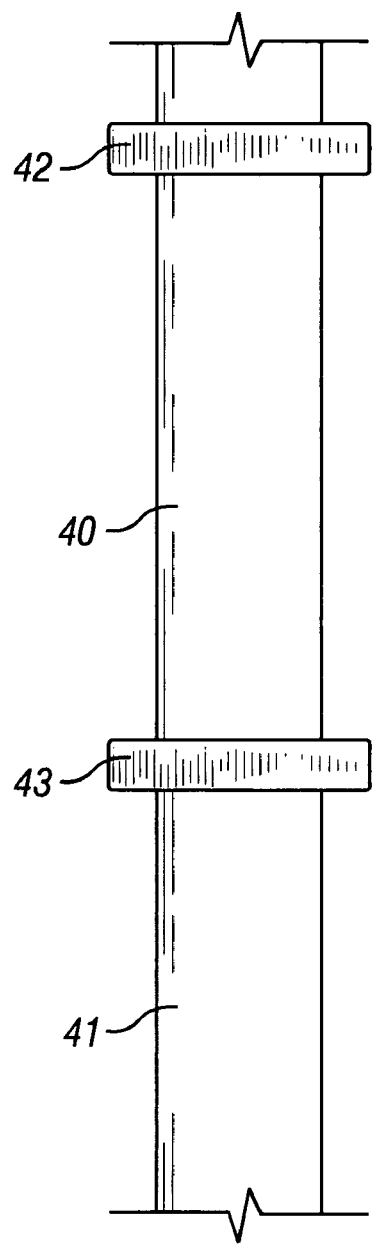
FIG. 4 is an elevated view of a pair of oilfield tubulars threaded together, and having a plurality of built-in collars which act as an upset, well-known in the prior art, to which an elevator can be attached for lifting or raising or otherwise moving each of the tubulars, as is well-known in the art when such collars are present.
Figure 5:
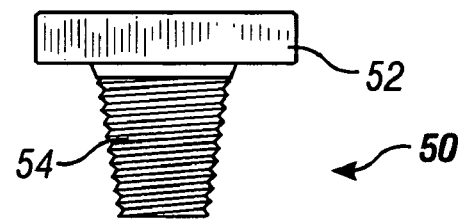
FIG. 5 illustrates a prior art device known as a nubbin which can be threaded into a box end of an oilfield tubular to provide a shoulder to which an elevator can be attached for moving an oilfield tubular up or down or otherwise moving such oilfield tubulars.

Referring now to the drawings in more detail, FIG. 1 is a conventional joint of oilfield tubular 10, for example, a joint of steel casing, which is well known in this art, which can typically be cemented into a drilled earth borehole, as is well known in the art. Such joints typically have a box end 12 having internal threads and a pin end 14 heaving external threads. The box end 12 and the pin end 14 are commonly referred to as the female end and the male end, respectively. As will be discussed hereinafter, the use of thread protectors in this art are usually concerned with protecting the threads of the pin end 14 because of its being exposed to being dropped and banged around.

FIG. 2 is a conventional joint 20 of oilfield tubular, also known in this art, for example, a joint of steel casing having a box end 22 and a pin end 24. The box end 22 and the pin end 24 involve two-step premium threads, well-known in this art, and which have proved to be troublesome for which to provide thread protection, for example for the pin end 24.

FIG. 3 illustrates a pair of oilfield tubulars 30 and 32, for example, steel casing. The tubular 30 and the tubular 32 may, for example, each be duplicates of tubular 10 shown in FIG. 1 or duplicates of tubular 20 shown in FIG. 2. When threaded together as illustrated in FIG. 3, this is known as a "flush" connection, for example, at the connection line 31.

In FIG. 4 of the drawings, there is illustrated the prior art assembly having a first oilfield tubular 40 threaded into a second oilfield tubular 41, each of which may be, for example, joints of steel casing. The casing joints 40 and 41 have a collar 42 and a collar 43, respectively, which can be used in conjunction with an elevator (not illustrated) which facilitates the raising or lowering of the tubular joints 40 and 41 into or out of an earth borehole. Collars 42 and 43 also facilitate the lifting of the casing string having the joints 40 and 41 into or out of the pipe racks used in conjunction with the running in or running out of the tubular string.

Paragraph 5 shows a prior art nubbin 50 having a collar 52 and a threaded portion 54 having male threads which can be threaded into, for example, the box end 12 of the tubular joint 10 illustrated in FIG. 1.

When the nubbin 50 is being used with the joint 10 illustrated in FIG. 1, after the nubbin is threaded into the tubular joint 10, an elevator can be attached to the collar 52 to raise or lower the tubular joint 10 when the casing string is being made up or disassembled. In effect, the use of the nubbin 50 in the prior art enables the simulation of the use of collar joints illustrated in FIG. 4, all as is known in the prior art. It should be appreciated that while the nubbin 50 works sufficiently well to enable the joint of casing to be raised or lowered by an elevator, use of the nubbin 50 can be quite burdensome if used with very large joints of steel casing. For example, the nubbin 50 weighs approximately 150 pounds and when sized to use with 18 inch steel casing, requires, sometimes, three men to hold the nubbin 50 over their heads, and to thread the nubbin 50 into the box end of the casing joint to be manipulated. This sometimes can take undue amounts of time, for example, fifteen or twenty minutes, to thread the nubbin 50 into the large diameter casing joint and then to be removed as soon as the casing joint is threaded into the joint of casing immediately below it in the casing string. This burdensome, time consuming use of the nubbin is well-known in this art.

Figure 6:
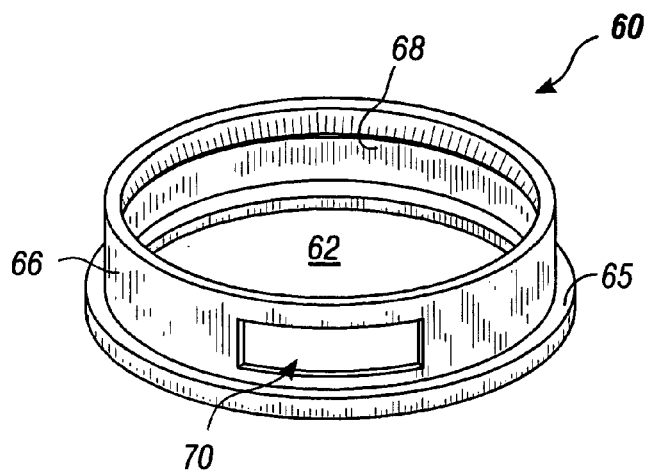
FIG. 6 is an isometric, pictorial view of an apparatus according to the present invention which together with the band illustrated in FIGS. 7 and 8 can be used to attach to the external surface of an oilfield tubular and to which an elevator may be attached.

Referring now to FIG. 6, there is illustrated an isometric, pictorial view of a steel or other metallic ring member 60 having a central flow passage 62 and having an internal diameter sized to fit over the end of a tubular joint such as tubular joint 10 in FIG. 1 and the tubular joint 20 in FIG. 2. The ring member 60 has attached at its lower end a upset collar member 64 having an external diameter slightly larger than the external diameter of the body 66 of the ring 60.

Figure 8:
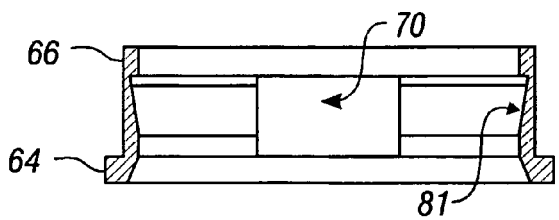
FIG. 8 is a sectional view of the device of FIG. 7, partly in cross-section, showing the sectional view of the device of FIG. 7.

Body 66 has a groove 68 which is recessed within the interior dimension of the body 66, which is shown in greater detail in FIG. 8. A slot 70 is milled completely through the body portion 66 and is aligned vertically with the internal groove 68 for reasons as set forth hereinafter.

Figure 7:
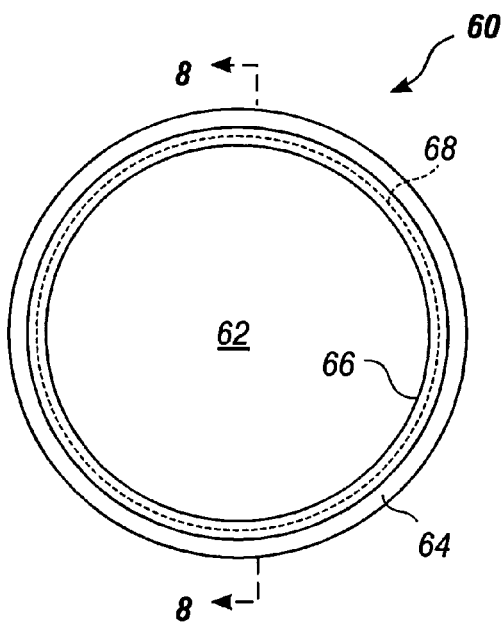
FIG. 7 illustrates the device of FIG. 6 in a top plan view.

Referring now to FIG. 7, there is a top view of the ring member 60, which illustrates the ring member 60 as having an internal passage 62 which is sized to barely slip over the exterior of an oilfield tubular such as the casing joint 10 in FIG. 1. A groove 68 is illustrated in dotted lines which is recessed on the internal diameter of the body 66.

Referring now to FIG. 8, there is illustrated a sectional view taken along the section line 8—8 of FIG. 7, which partly in cross section shows the body 66 joined at its lower end to collar 64. The ring body 66 has the mill slot 70 vertically, aligned with the groove 68. As illustrated in FIG. 8, the groove 68 has an inclined surface 81 against which the band 80 illustrated in FIGS. 9, 10, and 11, having an inclined surface 82 is accommodated. As shown in FIG. 1, the band 80 has a gap 84 to enable the two ends of the band 80 to be connected by a latch assembly described hereinafter.

Referring now to FIGS. 9–11, the metallic band 80 is illustrated in greater detail. As referenced above, the band 80 has a gap 84 which uses a latching assembly, described in more detail hereinafter, to draw the opposite ends of the band 80 closer together and to keep them from being spread apart when the latch assembly is latched. In FIG. 10, it is seen that the band 80 has an inclined surface 82 which will ride against the inclined surface 81 illustrated in FIG. 8. The band 80 has a sawtooth inner diameter 83 which provides a gripping surface against which the external diameter of a tubular joint can be gripped.

Referring now to FIG. 12, the apparatus which is earlier described with respect to FIGS. 6, 7 and 8, is also illustrated in FIG. 12, but which also includes the additional thread protector body 90 which at its lower end 92 rides upon the shoulder 64 when the device is used a thread protector for the pin end of a tubular joint, such as the pin end 14 illustrated with the tubular joint 10 in FIG. 1. With the arrangement illustrated in FIG. 2, the resulting configuration shows a flush surface between the lower end 92 and the collar 64. The internal diameter of the body 90 is chosen to be larger than the pin end 14 of the tubular joint 10 so that the inside surface of the body 91 of the member 90 does not touch the threads of the pin end 14. The upper end 94 of the body 90 extends in towards the centerline 96 of the body 90 as an optional feature to add more protection for the threads being protected on the pin end 14 of the tubular joint 10.

The body 90 illustrated in FIG. 12 is preferably non-metallic, for example plastic or hard rubber, to further decrease the possibility of the body 90 damaging the threads of the pin end 14.

Figure 13A:
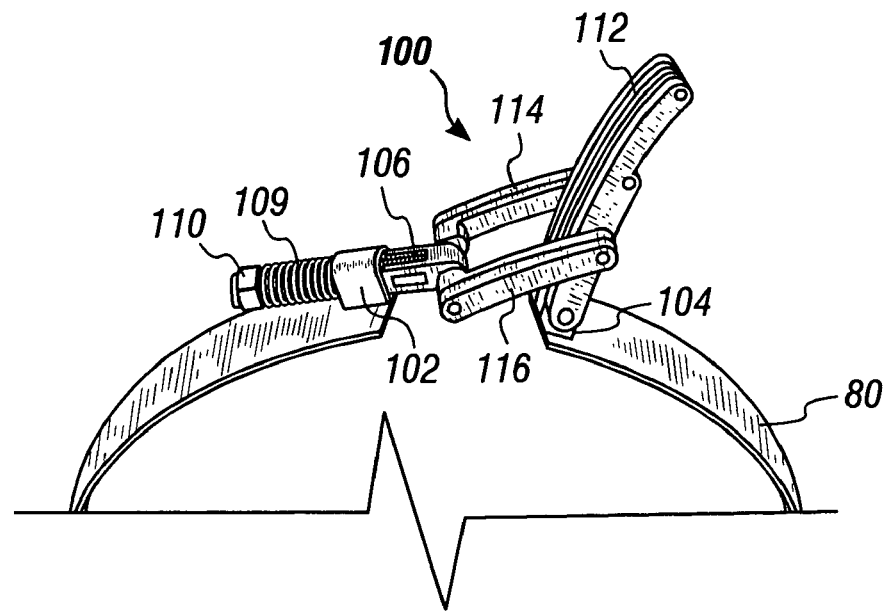
FIG. 13A is a pictorial view of the latching arrangement in the open position for use with the band illustrated in FIG. 11.
Figure 13B:
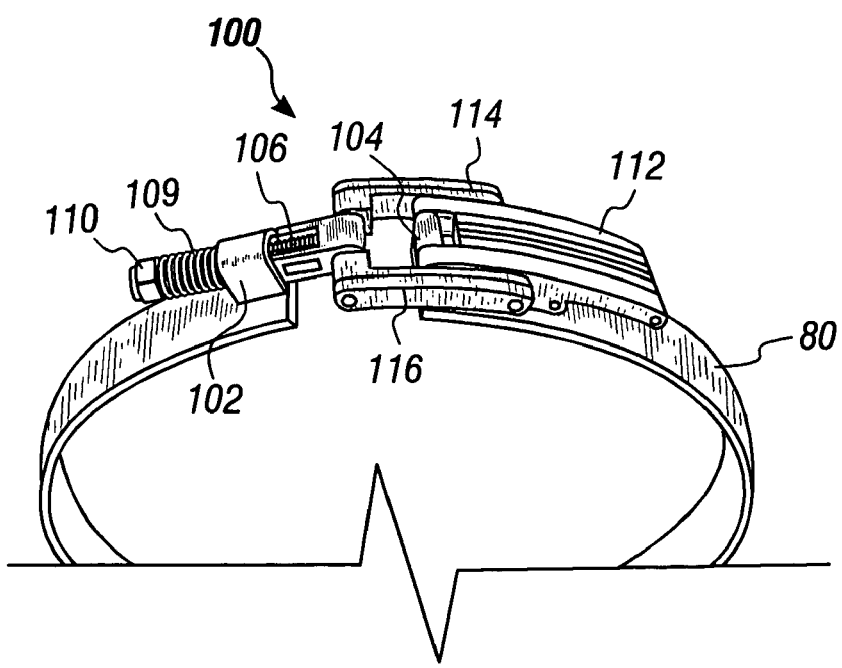
FIG. 13B is pictorial view of the band illustrated in FIG. 13A but which has been moved to the closed position of the latching apparatus.

Referring now to FIGS. 13A and 13B, an isometric view of the latch assembly 100 is illustrated which shows the band 80 illustrated in FIGS. 9, 10 and 11 that shows, in addition, the latch assembly 100 which is used to narrow the gap 84 illustrated in FIG. 11. A padeye 102 is attached to the other end of the band 80. A draw bolt 106 passes through the padeye 102 and has a spring 108 which is held on to the draw bolt 106 by a nut 110 which can be adjusted as needed, to vary the tension in the band and control the grip action of the band 80. A handle 112 is attached to a padeye 104.

A pair of latch links 114 and 116 are attached to a second end of the draw bolt and they are also attached at their second ends of handle 112.

Referring now to FIG. 14A and FIG. 14B, the draw bolt padeye 102 is shown in greater detail. In FIGS. 15A and 15B, the draw bolt 106 has a first threaded end and a smooth intermediate section 108 and a second end having a through-hole 110 through which the through-hole may receive an axis bolt which allows the links 114 and 116 to pivot. It should be appreciated that the intermediate smooth section 108 of the draw bolt 106 passes through the center portion of the padeye 102 and that the spring 109 illustrated in FIG. 13A is maintained between the padeye 102 and the nut 110. It should be appreciated that the tension in spring 109 can be altered by rotation of the nut 110 by one way or the other. The handle padeye 104 is shown in great detail in FIGS. 16A and 16B.

FIGS. 17A and 17B illustrate the handle 112 and FIG. 17B illustrates a different view of the handle 112 as illustrated in FIG. 17A. The handle padeye 104 shown in greater detail in FIGS. 16A and 16B, and then is arranged to be mounted within the U-shaped slot 113 of the handle 112 and the axle bolt passes through the through-hole 115 of the handle and through the hole 117 of the handle padeye 104, which allows the links 114 and 116 to pivot within the handle padeye 104 as the handle 112 is rotated.

The handle 112 also has a through-hole 119 which allows an axial bolt to pass through the through-hole 119 and also the through-holes 121 and 123, respectively, of the link arms 114 and 116, respectively. The two latch links 114 and 116 are illustrated respectively in FIGS. 18A, 18B, 19A and 19B. It should be appreciated that FIG. 18B is merely a difference view of the link shown in FIG. 18A, and that FIG. 19B is the same link as FIG. 19A but shown from a different view.

In using the band 80 having the handle 100 which is shown in its open position in FIG. 13A, the band 80 within the ring 60 is slipped over one end of the tubular joint 10. When the device is used as a thread protector, it is usually slipped over the end of the tubular joint 10 having the pin end 14. When it is used as a lift ring to which there will be attached an elevator, the device will be slipped over the box end of the tubular joint, assuming that the casing is usually run into the well with the box end up. Encasing the band 80 over the casing joint, it is first placed within the ring 60, illustrated in FIG. 6, so that it will rest within the groove 68. The handle 100 will be exposed to the rig hand through the mill slot 70. Thus, with the body 60 of FIG. 6 having the band 80 within the groove 68, the assembled device having the body 60 and the band 80 is slipped over the end of the tubular joint. As illustrated in FIG. 6, the body 60 will have its shoulder end 64 placed over the casing joint first and when properly positioned, usually a foot or so below the box end of the tubular joint 10, then the handle 112 for the latch mechanism 100 will be rotated away from the end having the nut 110 thereon. The latch is illustrated in the closed position in FIG. 13B. Closing the handle that way causes the two ends of the band 80 to be brought closer together where the internal diameter of the band is resting up against the exterior of the tubular joint 10. As seen in FIGS. 8 and 9–11, as the inclined surface 82, shown in FIG. 10, tries to run down the inclined surface 81 of FIG. 8, the band 80 moves tighter and tighter against the external surface of the tubular joint 10. The additional weight of the casing joint only tends to make the connection tighter and tighter against the external surface of the tubular joint 10.

When using the apparatus shown in FIG. 6 with the band 80 therein, and when the device is to be used as a thread protector, it will be turned upside-down and run past the pin end 14 to a point at which the band 80 will contact the exterior surface of the tubular joint 10, but the body 90 of the thread protector shown in FIG. 12 will not contact the threads of the pin end 14. Any movement of the casing joint 10 with respect to the thread protector, only makes the band 80 go tighter against the exterior surface of the tubular joint 10, which prevents the thread protector from falling off of the tubular joint 10 and will thus protect the threads of the pin end 14 until such time as the handle 112 is rotated back the other direction to allow the band 80 to fit more loosely around the tubular joint 10, and thus allow the thread protector to be easily removed from the tubular joint 10.

Figure 20:
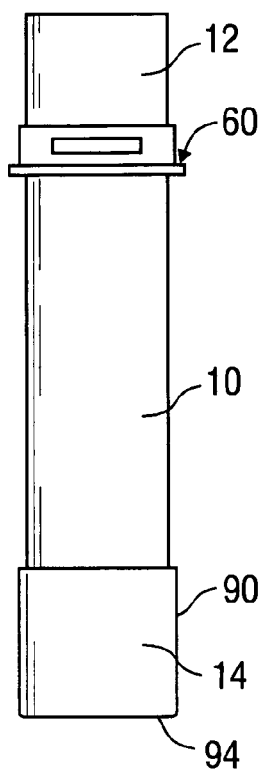
FIG. 20 is an elevated, pictorial view of a joint of oilfield tubular having a lift load ring on the box end of the tubular and a thread protector on the pin end of the tubular, in accordance with the present invention.

Referring now to FIG. 20, a prior art joint of oilfield tubular 10 such as is illustrated in greater detail in FIG. 1, and having an upper box end 12 and a lower pin end 14, is illustrated as having a load lifting ring 60 in accordance with the present invention attached near the upper box end having the internal thread 12, and also having the thread protector in accordance with the present invention connected near the lower pin end of the tubular 10 to protect the male thread 14, such as is illustrated in FIG. 1, but could also include the lower pin end having the male threads 24, such as are illustrated in FIG. 2.

Thus, it should be appreciated that both the lifting load ring and thread protector, both in accordance with the present invention, can be used on the same joint of oilfield tubular as the tubular is being manipulated, such as moving the tubular from horizontal to vertical, or vice versa, or when tripping the tubular into or out of the wellbore, such as is commonly done on an oilfield drilling rig or a completion rig when tripping casing into or out of the wellbore.

Figure 21A:
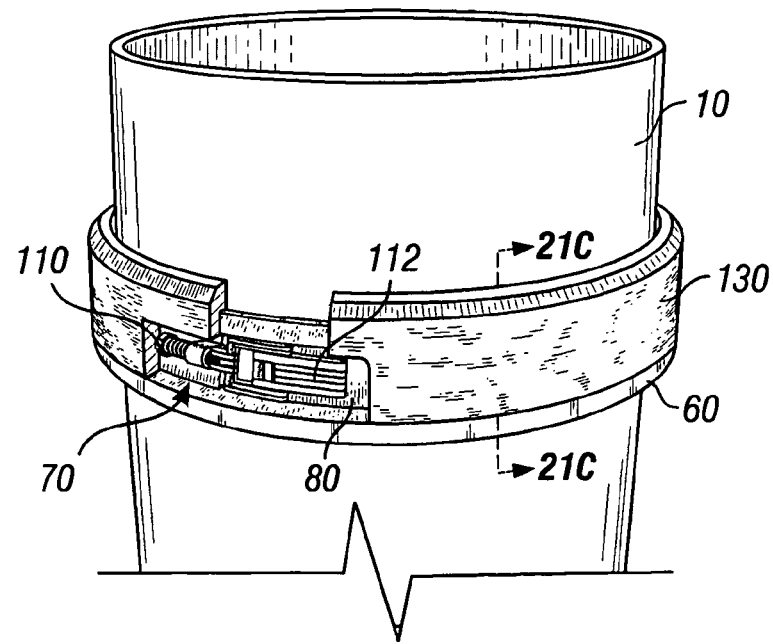
FIG. 21A is an elevated, isometric view of an alternative view of the load ring according to the present invention having a second ring made of hard plastic to protect the latch mechanism when passing through the elevator slips.
Figure 21B:
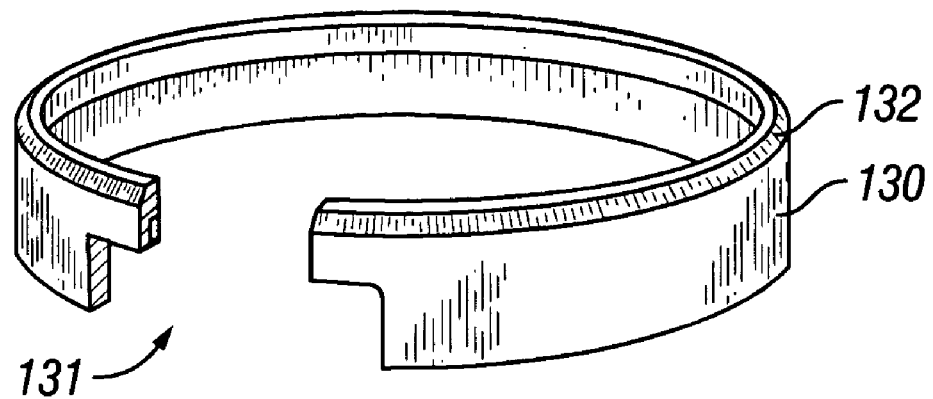
FIG. 21B is an elevated, isometric view of the hard plastic ring illustrated in FIG. 21A.
Figure 21C:
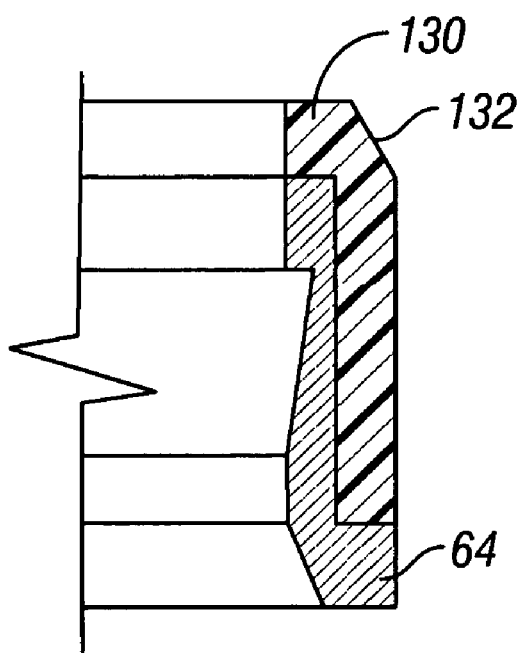
FIG. 21C is an elevated, cross-sectional view of the load ring taken along the section line 23A—23A illustrated in FIG. 21A.

FIG. 21A is an elevated, isometric view of a box end of a partial length of an oilfield tubular illustrating the ring member 60 as illustrated in FIG. 6, but having an optional ring member 130, also illustrated in FIGS. 21B and 21C. The ring member 130 preferably is a split ring, manufactured, milled, formed, extruded, modeled or otherwise made from nylon, TEFLON* (trademark for tetrafluoroethylene fluorocarbon polymer), high density polypropylene or other hard plastic, or a combination of two or more hard plastics to protect the latch mechanism 100 illustrated in FIGS. 13A and 13B, when the combined apparatus having the load ring 60 and the second ring 130 is passing through the elevator slips (not illustrated). By having the ring 130 be a split ring, and by the internal diameter of the ring 130 being slightly smaller than the outside diameter of the tubular 10, the ring 130 can form a more snug fit against the tubular 10. In addition, as shown in cross-section in FIG. 21C, the ring 130 preferably is bonded to the sidewall 66 and against the top surface 65 of the collar member 64 illustrated in FIG. 6.

*Trademark of Dupont de Nemours, E.I. & Co.

The ring 130 also has a cut-out portal 131 which is aligned with the slot 70 illustrated in FIG. 6 to allow access to the latch mechanism 100. The top end of the ring 130 has a beveled edge 132 to also facilitate passing the combination load ring through the elevator slips.

Referring now to FIG. 22A there is illustrated a ring band 180 which is essentially identical to the band 80 illustrated in FIG. 11. The band 180 has first and second ends 181 and 183 having pins 185 and 187, respectively.

As illustrated in FIG. 22B, the ends 181 and 183 are illustrated as being moved closer together.

FIG. 22C illustrates a plate 182 having a plurality of holes therein, for example, the five holes numbered 188, 189, 190, 191 and 193. In use, the hole 188 slidably fits over the pin 185 in FIG. 22B and one of the other holes 189, 190, 191 or 193 can be slidably fitting over the pin 187 to hold the ends 181 and 183 closer together as illustrated in FIG. 22B. Prior to placing the plate 182 over the pins 185 and 187, the ends 181 and 183 can be pushed closer together by hand or by a tool as appropriate.

FIG. 22D illustrates an alternative method and apparatus for pulling the two ends 181 and 183 closer together. The spring 192, having a pair of hooks 220 and 222 at the respective ends of the spring 192, are placed over the pins 185 and 187, respectively, while the spring 192 is pulled apart by hand, or by a chosen tool. By then releasing the spring 192, the ends 181 and 183 are pulled closer together and are maintained closer together by the spring 192. It should be appreciated that in the relaxed position of the spring 192, the pins 185 and 187 in the relaxed position of the band 180, as illustrated in FIG. 22A, are distanced apart by an amount greater than the distance between the hooks 220 and 222.

FIG. 22E illustrates an alternative embodiment of the invention using a slidable plate 202. In operation, the holes 203 and 205 are slidably placed onto the pins 185 and 187 and then the two plates 204 and 206 are caused to slide towards each other by having a ratcheting surface 207 on the plate 204 and a ratcheting surface 209 on the plate 206. The movement of the two plates cause the two ends 181 and 183 to be moved closer together and maintained in that position.

It should this be appreciated that although the clamping mechanism 100 illustrated in FIGS. 13A and 13B are the preferred embodiment of the apparatus for pulling the ends 181 and 183 closer together to thereby contact the exterior of the casing, the additional means illustrated in FIGS. 22A, 22B, 22C, 22D, 22E and 22F also function to cause the band 80, or 180 as the case may be, to be moved closer together to reduce the internal diameter of the band 180 to thereby contact the exterior surface of the casing and thus enable the load ring and/or the thread protector to function as contemplated by this invention.

The invention claimed is:

1. A thread protector for protecting the pin end of the oilfield tubular having a box end and a pin end comprising:
    a first cylindrical ring sized to slide over the exterior surface of the pin end of said tubular, said ring having a first end, a second end, and a shoulder ring having upper and lower surfaces at its first end and a sidewall between said second end and said shoulder end, said sidewall having a circumferential groove about its interior surface, and a second groove through said sidewall for accessing said circumferential groove;
    a split-ring metal band having first and second ends positioned within said circumferential groove having a latch mechanism connected between said first and second ends of said band, said latch mechanism having a handle accessible through said second groove which, when activated, reduces the internal diameter of said band, and when deactivated, increases the internal diameter of said band, whereby the activation of said handle causes said band to grip the non-threaded, exterior surface of said tubular, and the deactivation of said handle causes said band to release the non-threaded, exterior surface of said tubular, wherein said apparatus does not depend upon engaging the threads to protect such thread.

2. The thread protector according to claim 1, wherein said band has, at least in part, a saw tooth inner diameter for gripping the non-threaded, external surface of said oilfield tubular.

3. The thread protector according to claim 1, wherein the circumferential groove has a first inclined surface, and said metal band has a second inclined surface which can ride along said first inclined surface of said circumferential band, whereby the band grips the non-threaded, external surface of said tubular even tighter if the oilfield tubular attempts to escape the grip of the band.

4. The thread protector according to claim 1, including in addition thereto, a first cylindrical, non-metallic body bonded, cemented or otherwise firmly attached to a surface of said shoulder ring, wherein said first non-metallic body has an internal diameter greater than the external diameter of the threaded pin end of said oilfield tubular.

5. A thread protector for protecting the pin end of the oilfield tubular having a box end and a pin end comprising:
   a first cylindrical ring sized to slide over the exterior surface of the pin end of said tubular, said ring having a first end, a second end, and a shoulder ring having upper and lower surfaces at its first end and a sidewall between said second end and said shoulder end, said sidewall having a circumferential groove about its interior surface, and a second grove through said sidewall for accessing said circumferential groove;
   a split-ring metal band having first and second ends positioned within said circumferential groove having latch means connected between said first and second ends of said band, said latch means, when activated, reducing the internal diameter of said band, and when deactivated, increasing the internal diameter of said band, whereby the activation of said latch means causes said band to grip the non-threaded, exterior surface of said tubular, and the deactivation of said latch means causes said band to release the non-threaded, exterior surface of said tubular, wherein said apparatus does not depend upon engaging the threads to protect such thread.

6. The thread protector according to claim 5, wherein said band has, at least in part, a saw tooth inner diameter for gripping the non-threaded, external surface of said oilfield tubular.

7. The thread protector according to claim 5, wherein the circumferential groove has a first inclined surface, and said metal band has a second inclined surface which can ride along said first inclined surface of said circumferential band, whereby the band grips the external surface of said tubular even tighter if the oilfield tubular attempts to escape the grip of the band.

8. The thread protector according to claim 5, including in addition thereto, a first cylindrical, non-metallic body bonded, cemented or otherwise firmly attached to a surface of said shoulder ring, wherein said first non-metallic body has an internal diameter greater than the external diameter of the threaded pin end of said oilfield tubular.

9. A system for installing a load ring onto the box end of an oilfield tubular having a box end and a pin end, and for installing a thread protector onto the pin end of said tubular, comprising;
   a load ring for raising and/or lowering an oilfield tubular having a box end and a pin end, comprising a first cylindrical ring sized to slide over the exterior surface of the box end of said tubular, said ring having a first end, a second end, and a shoulder ring at its first end and a sidewall between said second end and said shoulder end, said sidewall having a first circumferential groove about its interior surface, and a second groove through said sidewall for accessing said first circumferential groove;
   a first split-ring metal band having first and second ends positioned within said first circumferential groove having first latch means connected between said first and second ends of said first band, wherein said first latch means, when activated, reduces the internal diameter of said first band, and when deactivated, increases the internal diameter of said first band, whereby the activation of said first latch means causes said first band to grip the exterior surface of said tubular, and the deactivation of said first latch means causes said first band to release the exterior surface of said tubular;
   a thread protector comprising a second cylindrical ring sized to slide over the exterior surface of the pin end of said tubular, said second ring having a first end, a second end, and a shoulder ring having upper and lower surfaces at its first end and a sidewall between said second end and said shoulder end, said sidewall having a second circumferential groove about its interior surface, and a fourth groove through said sidewall for accessing said second circumferential groove;
   a second split-ring metal band having first and second ends positioned within said second circumferential groove having second latch means connected between said first and second ends of said second band, wherein said means, when activated, reduces the internal diameter of said second band, and when deactivated, increases the internal diameter of said second band, whereby the activation of said second latch means causes said second band to grip the non-threaded, exterior surface of said tubular, and the deactivation of said second latch means causes said second band to release the non-threaded, exterior surface of said tubular, wherein said apparatus does not depend upon engaging the threads to protect such thread.

10. The system according to claim 9, including an addition thereto, a second cylindrical, non-metallic body bonded, cemented or otherwise firmly attached to a surface of said shoulder ring forming a part of said thread protector, wherein said non-metallic body has an internal diameter greater than the external diameter of the threaded pin of said oilfield tubular.

11. The system according to claim 10, wherein each of said first and second bands has, at least in part, a saw tooth inner diameter for gripping the non-threaded, external surface of said oilfield tubular.

12. The system according to claim 11, wherein said first circumferential groove has a first inclined surface, said first metal band has a second inclined surface, said second circumferential groove has a third inclined surface and said second metal band has a fourth inclined surface, wherein said second inclined surface can ride along said first inclined surface and said fourth inclined surface can ride along said third inclined surface, whereby each of said first and second bands grips the non-threaded, external surface of said oilfield tubular even tighter if the oilfield tubular attempts to escape the grip of the respective bands.

13. A system for installing a load ring onto the box end of an oilfield tubular having a box end and a pin end, and for installing a thread protector onto the pin end of said tubular, comprising;
   a load ring for raising and/or lowering an oilfield tubular having a box end and a pin end, comprising a first cylindrical ring sized to slide over the exterior surface of the box end of said tubular, said ring having a first end, a second end, and a shoulder ring at its first end and a sidewall between said second end and said shoulder end, said sidewall having a first circumferential groove about its interior surface, and a second groove through said sidewall for accessing said first circumferential groove;

a first split-ring metal band having first and second ends positioned within said first circumferential groove having a first latch mechanism connected between said first and second ends of said first band, said first latch mechanism having a first handle accessible through said second groove which, when activated, reduces the internal diameter of said first band, and when deactivated, increases the internal diameter of said first band, whereby the activation of said first handle causes said first band to grip the exterior surface of said tubular, and the deactivation of said first handle causes said first band to release the exterior surface of said tubular;

a thread protector comprising a second cylindrical ring sized to slide over the exterior surface of the pin end of said tubular, said second ring having a first end, a second end, and a shoulder ring having upper and lower surfaces at its first end and a sidewall between said second end and said shoulder end, said sidewall having a second circumferential groove about its interior surface, and a fourth groove through said sidewall for accessing said second circumferential groove;

a second split-ring metal band having first and second ends positioned within said second circumferential groove having a second latch mechanism connected between said first and second ends of said second band, said latch mechanism having a second handle accessible through said fourth groove which, when activated, reduces the internal diameter of said second band, and when deactivated, increases the internal diameter of said second band, whereby the activation of said second handle causes said second band to grip the non-threaded, exterior surface of said tubular, and the deactivation of said second handle causes said second band to release the non-threaded, exterior surface of said tubular, wherein said apparatus does not depend upon engaging the threads to protect such thread.

14. The system according to claim 13, including an addition thereto, a second cylindrical, non-metallic body bonded, cemented or otherwise firmly attached to a surface of said shoulder ring forming a part of said thread protector, wherein said non-metallic body has an internal diameter greater than the external diameter of the threaded pin of said oilfield tubular.

15. The system according to claim 14, wherein each of said first and second bands has, at least in part, a saw tooth inner diameter for gripping the non-threaded, external surface of said oilfield tubular.

16. The system according to claim 15, wherein said first circumferential groove has a first inclined surface, said first metal band has a second inclined surface, said second circumferential groove has a third inclined surface and said second metal band has a fourth inclined surface, wherein said second inclined surface can ride along said first inclined surface and said fourth inclined surface can ride along said third inclined surface, whereby each of said first and second bands grips the non-threaded, external surface of said oilfield tubular even tighter if the oilfield tubular attempts to escape the grip of the respective bands.

* * * * *